(No Model.)
I. E. STOREY.
FRICTION GEAR.
No. 418,297. Patented Dec. 31, 1889.
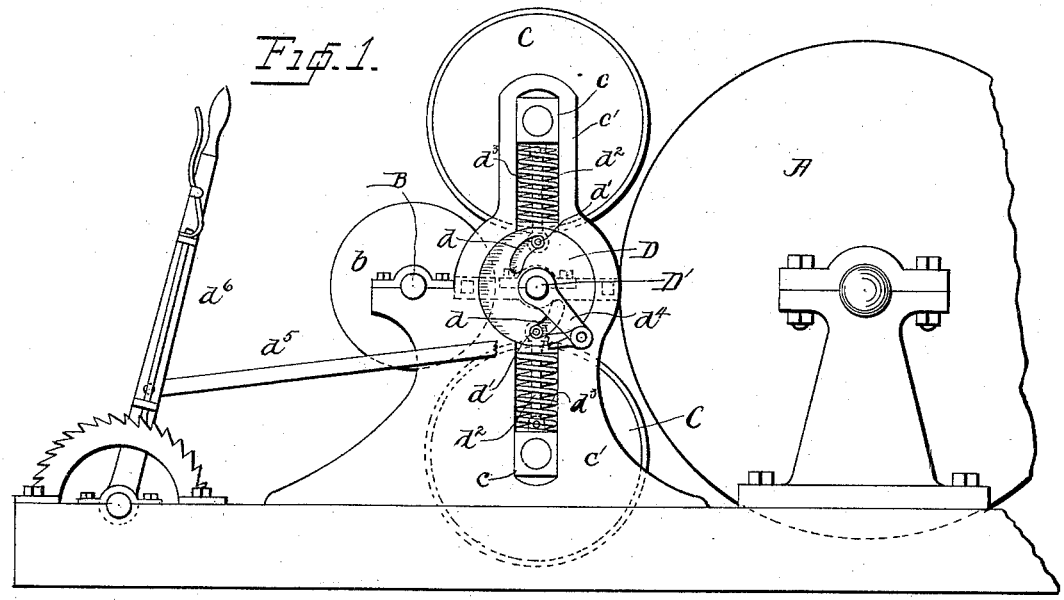
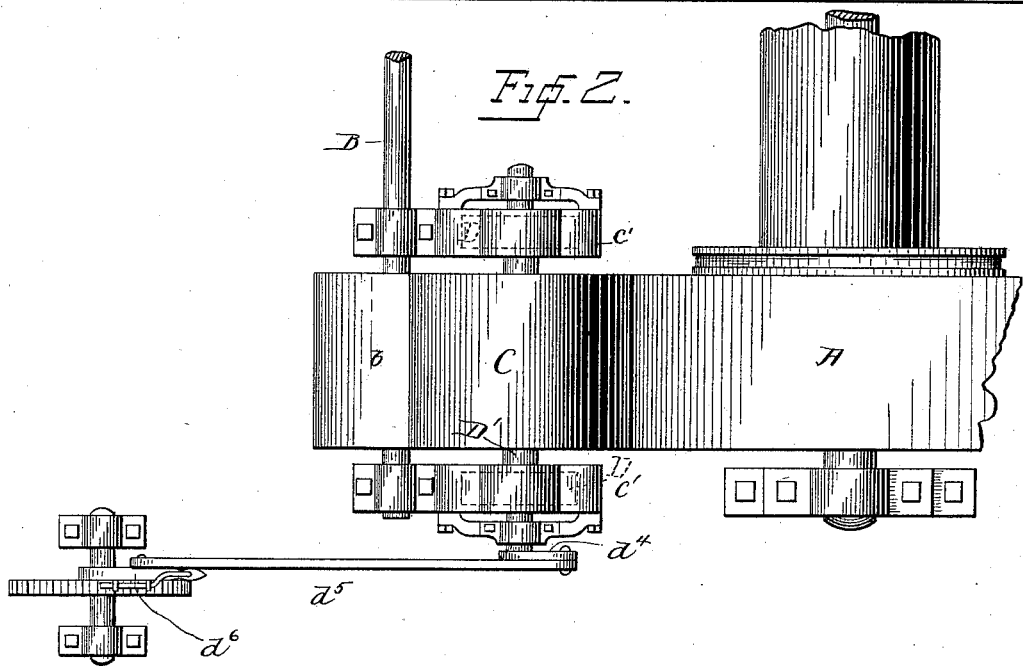
WITNESSES:
W. A. Courtland
Wm. A. Rosenbaum
INVENTOR
Imle E. Storey
BY
Johnston
ATTORNEY

UNITED STATES PATENT OFFICE.

IMLE E. STOREY, OF BOULDER, COLORADO.

FRICTION-GEAR.

SPECIFICATION forming part of Letters Patent No. 418,297, dated December 31, 1889.

Application filed April 16, 1889. Serial No. 307,423. (No model.)

*To all whom it may concern:*

Be it known that I, IMLE E. STOREY, a citizen of the United States, residing in Boulder, in the county of Boulder and State of Colorado, have invented certain new and useful Improvements in Friction-Gears, of which the following is a specification.

My invention pertains to friction-gear or to an apparatus whereby motion is transmitted from a power-driven shaft to a loaded shaft by means of friction.

The invention is particularly adapted to hoisting apparatus where it becomes necessary to utilize an apparatus which is susceptible of great delicacy in operation.

The invention consists, generally, of the combination, with a power-driven shaft or pulley and a loaded shaft or pulley, of a pair of friction-pulleys located upon the opposite sides of a line drawn between the centers of the power and loaded shafts and between said shafts, and mechanism whereby the relative positions of the pulleys may be changed in order to regulate the friction between the same.

The invention will now be described with reference to the accompanying drawings, in which—

Figure 1 represents a side elevation of the apparatus, and Fig. 2 represents a plan of the same.

A represents a hoisting-drum, which is to be driven from the shaft B. Shaft B may be driven by an electric motor, steam-engine, or any other power. It carries a drum or pulley $b$.

C and C represent two friction pulleys or gears for transmitting motion from the power-shaft B to the drum A. These pulleys are arranged between the shafts of the drum and power and upon the opposite sides of a straight line drawn between said two shafts. The pulleys are mounted in sliding bearings $c$, located in two standards $c'$ $c'$. A suitable way or opening is formed in the standards to allow movement of the bearings toward and away from each other. Midway between the two bearings on each side I have located a disk D, provided with two eccentric slots $d$. In these slots small anti-friction rollers $d'$ are located. They are connected with links $d^2$, fixed to the inner sides of the bearings $c$ $c$. The space between the disk D and the bearings $c$ is occupied by a spring $d^3$ of any description, preferably a coil metallic spring. The tendency of these springs is to force the bearings away from the disk in opposite directions. The disk has connected with it a concentric crank $d^4$, to which is attached pitman $d^5$, running to the pivoted operated lever $d^6$. Lever $d^6$ may be locked in any desired position by means of the usual segment-plate. From this construction it is obvious that by moving the lever $d^6$ the pulleys C C may be thrown toward or away from each other at will. The rotation of the disk D, caused by the movement of the crank $d^4$, will draw the links $d^2$ and bearings $c$ toward the center, and consequently the pulleys C against the peripheries of the pulleys A and $b$. The peripheries of the pulleys are located closely adjacent to the peripheries of the drum A and pulley $b$, so that a slight movement of lever $d^6$ will be sufficient. In the manipulation of apparatus of this nature it becomes necessary quite often to allow the loaded shaft to slip to a greater or less extent in order to ease up the motion. On the other hand, it is necessary at times to prevent all slip and handle the load positively. With my invention it is obvious that I may increase the friction to a practically unlimited extent by forcing lever $d^6$ over to any notch on its segment-plate.

Having thus described my invention, I claim—

1. The combination, with the power and loaded pulleys, the two friction-pulleys having movable bearings and located upon each side of said power and loaded pulleys, of the two disks D D, provided with eccentric slots $d$ $d$, the links $d^2$ $d^2$, connected with the movable bearings of the friction-pulleys and carrying the rollers $d'$ $d'$, which project into the eccentric slots, and mechanism for rotating said disks, for the purpose described.

2. The combination, with the power and loaded pulleys, the two friction-pulleys having movable bearings and located upon each side of said power and loaded pulleys, of the two disks D D, provided with eccentric slots $d$ $d$, the links $d^2$ $d^2$, connected with the movable bearings of the friction-pulleys and carrying the rollers $d'$ $d'$, which project into the eccentric slots, springs for forcing the movable bearings away from each other, and mechanism for rotating said disks, for the purpose described.

In witness whereof I have hereunto signed my name in the presence of two subscribing witnesses.

IMLE E. STOREY.

Witnesses:
WM. A. ROSENBAUM,
F. C. GRUEN.